US010878687B2

(12) United States Patent
Cholhan et al.

(10) Patent No.: US 10,878,687 B2
(45) Date of Patent: *Dec. 29, 2020

(54) HELMET AND METHOD OF USE FOR EMERGENCY NOTIFICATION

(71) Applicant: CHOPRIX LLC, Rochester, NY (US)

(72) Inventors: Hilary J. Cholhan, Rochester, NY (US); Remy Cholhan, Rochester, NY (US)

(73) Assignee: CHOPRIX LLC, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/527,567

(22) Filed: Jul. 31, 2019

(65) Prior Publication Data

US 2019/0355232 A1  Nov. 21, 2019

Related U.S. Application Data

(63) Continuation of application No. 15/897,303, filed on Feb. 15, 2018, now Pat. No. 10,373,480, which is a
(Continued)

(51) Int. Cl.
 *G08B 1/08* (2006.01)
 *G08B 25/01* (2006.01)
 (Continued)

(52) U.S. Cl.
 CPC .......... *G08B 25/016* (2013.01); *H04W 4/021* (2013.01); *H04W 4/90* (2018.02)

(58) Field of Classification Search
 CPC ....... G08B 25/016; H04W 4/90; H04W 4/021
 See application file for complete search history.

(56) References Cited

U.S. PATENT DOCUMENTS 5,200,736 A  4/1993  Coombs et al.
6,889,942 B2  5/2005  Preston
(Continued)

FOREIGN PATENT DOCUMENTS

DE  29503057  4/1995
WO  WO2010051287  5/2010

OTHER PUBLICATIONS

International Preliminary Report on Patentability and Written Opinion of the International Searching Authority dated Sep. 29, 2015, issued in PCT Application No. PCT/US14/031984, 6 pages.
(Continued)

*Primary Examiner* — Phung Nguyen
(74) *Attorney, Agent, or Firm* — Heslin Rothenberg Farley & Mesiti P.C.

(57) ABSTRACT

A wearable emergency alert apparatus includes a communication device configured to communicate an alert to a node on a network external to the emergency alert apparatus, a shock sensor in communication with the communication device, where the sensor is pre-configured to send a message to the communication device based on experiencing pressure from a source external to the emergency alert apparatus exceeding a pre-determined threshold, and where the device is configured to communicate the alert based on receiving the message. The apparatus also includes a microcontroller communicatively coupled to one or more of: the communication device, or the shock sensor and a heat sensor communicatively coupled to the microcontroller. Based on the heat sensor obtaining a heat value exceeding a given threshold, the microcontroller activates one or more of: the communication device, or the shock sensor. A power source is also electronically coupled to the communication device and the microcontroller.

16 Claims, 11 Drawing Sheets

Related U.S. Application Data continuation of application No. 15/277,452, filed on Sep. 27, 2016, now Pat. No. 9,922,536, which is a continuation of application No. PCT/US2014/054210, filed on Sep. 5, 2014, which is a continuation-in-part of application No. 14/227,493, filed on Mar. 27, 2014, now Pat. No. 9,311,801, and a continuation of application No. 14/227,499, filed on Mar. 27, 2014, now Pat. No. 9,569,951, and a continuation-in-part of application No. PCT/US2014/031984, filed on Mar. 27, 2014.

(60) Provisional application No. 61/805,573, filed on Mar. 27, 2013.

(51) Int. Cl.
*H04W 4/021* (2018.01)
*H04W 4/90* (2018.01)

(56) References Cited

U.S. PATENT DOCUMENTS

| | | | |
|---|---|---|---|
| 9,311,801 | B2 | 4/2016 | Cholhan et al. |
| 9,569,951 | B2 | 2/2017 | Cholhan et al. |
| 9,596,901 | B1 | 3/2017 | Anvari |
| 9,922,536 | B2 | 3/2018 | Cholhan et al. |
| 10,373,480 | B2 | 8/2019 | Cholhan et al. |
| 2003/0197095 | A1 | 10/2003 | Preston |
| 2007/0177651 | A1 | 8/2007 | Daugherty et al. |
| 2009/0174547 | A1 | 7/2009 | Greene et al. |
| 2010/0227585 | A1 | 9/2010 | Carroll et al. |
| 2010/0323658 | A1* | 12/2010 | Lagergren .............. H04M 11/04 455/404.2 |
| 2011/0298613 | A1 | 12/2011 | Ben Ayad Mourad |
| 2012/0188083 | A1* | 7/2012 | Miller, II ............... A42B 3/046 340/573.1 |
| 2012/0265477 | A1* | 10/2012 | Vock ...................... G01S 19/00 702/130 |
| 2012/0286933 | A1 | 11/2012 | Hsaio |
| 2013/0060168 | A1* | 3/2013 | Chu ..................... A61B 5/6803 600/595 |
| 2013/0222139 | A1* | 8/2013 | Gouge .................... A61B 5/01 340/573.1 |
| 2013/0278416 | A1 | 10/2013 | Button et al. |
| 2013/0289925 | A1* | 10/2013 | Jiang ..................... G06Q 10/06 702/122 |
| 2014/0260331 | A1 | 9/2014 | Lofy et al. |
| 2016/0018278 | A1 | 1/2016 | Jeter, II |
| 2016/0171864 | A1 | 6/2016 | Ciaramelletti et al. |
| 2018/0174431 | A1 | 6/2018 | Cholhan et al. |

OTHER PUBLICATIONS

International Search Report and Written Opinion of the International Searching Authority dated Jul. 30, 2014, issued in PCT Application No. PCT/US14/031984, 10 pages.

International Search Report and Written Opinion of the International Searching Authority dated May 19, 2015 issued in PCT Application No. PCT/US2014/054210, 8 pages.

\* cited by examiner

◯ SHOCK / PRESSURE SENSORS

☐ HEAT SENSORS

HELMET AND METHOD OF USE FOR EMERGENCY NOTIFICATION

CROSS REFERENCE TO RELATED APPLICATION

This application is a continuation of U.S. non-provisional patent application Ser. No. 15/897,303, filed Feb. 15, 2018, which issued on Aug. 6, 2019 as U.S. Pat. No. 10,373,480, which is a continuation of U.S. non-provisional patent application Ser. No. 15/277,452, filed on Sep. 27, 2016 which issued on Mar. 20, 2018 as U.S. Pat. No. 9,922,536, which is a continuation of PCT Application Number PCT/US2014/054210 filed on Sep. 5, 2014, which was a continuation in part of U.S. non-provisional patent application Ser. No. 14/227,493 filed on Mar. 27, 2014 which issued on Apr. 12, 2016 as U.S. Pat. No. 9,311,801, and U.S. non-provisional patent application Ser. No. 14/227,499, filed on Mar. 27, 2014 which issued on Feb. 14, 2017 as U.S. Pat. No. 9,569,951, and PCT Application Number PCT/US2014/031984 filed on Mar. 27, 2014, all of which claim priority to U.S. provisional patent application No. 61/805,573, filed on Mar. 27, 2013, which are all hereby incorporated herein by reference in their entirety.

FIELD OF INVENTION

The present invention relates generally to a helmet and a method of using the helmet to alert emergency services personnel to a need for assistance. The helmet can be configured for use with a system that is usable in geographic regions that are sparsely populated that feature uneven terrain, as well as in densely populated urban environments, and/or outdoor recreation areas. The helmet can also be utilized as a stand-alone device for emergency notification.

BACKGROUND OF INVENTION

Many pastimes can require individuals to explore isolated terrain, thus leaving these individuals stranded in the event of an unforeseen emergency, such as a medical emergency and/or weather-related hazard. For example, in the winter, many outdoor sports come with the risk of the participant being injured and possibly stranded in calamitous events (e.g., avalanches).

In fact, millions of people throughout the world enjoy activities that expose them to the perils of accidents. Every year many avid outdoor sportsmen and women are victimized by sports-related disasters. For example, when the activity involves being outdoors in the cold weather, danger such as potential avalanches, and various accidents while engaging in backcountry and on-piste skiing, off-piste skiing, snowboarding, snowshoeing, mountaineering, hiking and riding a snowmobile can pose risks to the participant.

In addition to sports-related disasters, individuals participate in certain activities that expose them to risks of injuries, such as head trauma. Riding a motorcycle is an example of a well known pastime that carries with it a high risk of head injuries.

SUMMARY OF INVENTION

Shortcomings of the prior art are overcome and additional advantages are provided through the provision of a wearable emergency alert apparatus, comprising: a communication device configured to communicate an alert to a node on a communications network external to the wearable emergency alert apparatus; a shock sensor in communication with the communication device, wherein the shock sensor is pre-configured to send a message to the communication device based on experiencing pressure from a source external to the wearable emergency alert apparatus exceeding a pre-determined threshold, and wherein the communication device is configured to communicate the alert based on receiving the message; a microcontroller communicatively coupled to one or more of: the communication device, or the shock sensor; a heat sensor communicatively coupled to the microcontroller, wherein based on the heat sensor obtaining a heat value exceeding a given threshold, the microcontroller activates one or more of: the communication device, or the shock sensor; and a power source electronically coupled to the communication device and the microcontroller.

Computer systems, computer program products, wearable objects, and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

The foregoing and objects, features, and advantages of one or more aspects of the invention are apparent from the following detailed description taken in conjunction with the accompanying drawings in which.

DETAILED DESCRIPTION OF THE INVENTION

Figure 1:
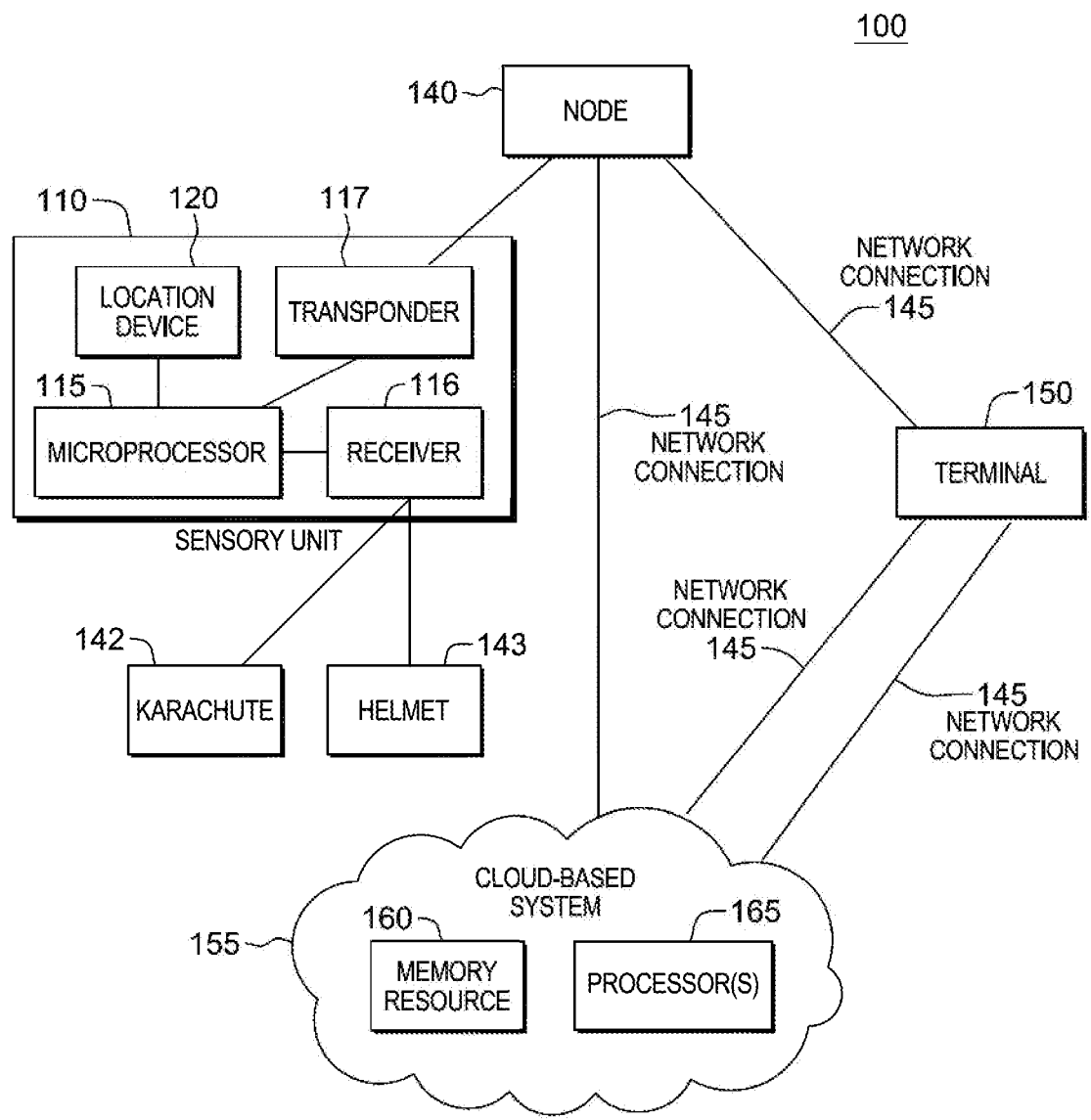
FIG. 1 is an embodiment of a system that practices one or more aspects of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to obscure unnecessarily the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present invention includes embodiments of a helmet, methods of using a helmet, and methods of making a helmet. Embodiments of the helmet can be worn, for example, during athletic endeavors and the helmet is configured to communicate with an emergency response system when the helmet experiences an impact of a pre-determined threshold. Additionally, embodiments of the present invention include heat sensors. The heat sensors monitor the temperature inside the helmet and when the temperature inside the helmet reaches a pre-determined threshold, activate the electronic alert system within the helmet, which includes at least one shock sensor. To simplify this disclosure, the term shock sensor, as used in this application, encompasses an example from a group of sensors that includes shock, impulse, load detection, and/or pressure sensors.

U.S. patent application Ser. No. 14/227,493, and U.S. patent application Ser. No. 14/227,499, both entitled "EMERGENCY NOTIFICATION APPARATUS AND METHOD," and both filed Mar. 27, 2014, are incorporated herein by reference in their entirety. These applications disclose that a helmet with integrated shock sensors utilized in a system that enables individuals who are in distress, but may or may not be conscious, to alert emergency response personnel of their need for assistance. Aspects of this system can be used, for example, to alert emergency responders to sports-related emergencies, for example, skiing, hiking, biking, motorcycling, skating, etc. Herein disclosed is a helmet for use with the earlier disclosed emergency notification system and apparatus as well as for use with communication systems, including emergency response systems, that are known to one of skill in the art. The present invention is also suitable for use in an avalanche-related emergency, as described in U.S. patent application Ser. No. 14/227,493, and U.S. patent application Ser. No. 14/227,499, however, as understood by one in the art, the functionality of embodiments of the present invention can be adapted for use across many athletic and non-athletic endeavors (e.g., motorcycling).

U.S. patent application Ser. No. 14/227,493, and U.S. patent application Ser. No. 14/227,499 describe a sensory unit (SU) and location device that can be configured to communicate with further elements of an emergency response system. As described in these applications, one such element that can communicate with the SU and location device, and can work in conjunction with emergency alert system, is a helmet with integrated sensors, including both heat sensors and shock sensors. Embodiments of the helmet of the present invention include integrated shock sensors, which ultimately communicate with a cloud-hosted alert system described in the pending applications, and to emergency personnel.

The present disclosure describes embodiments of the present invention that work in conjunction with elements of the system described in U.S. patent application Ser. No. 14/227,493, and U.S. patent application Ser. No. 14/227,499, such as the wearable apparatus (e.g., belt) disclosed. However, although embodiments of the helmet disclosed in this application can work in conjunction with the belt and the elements in the belt described in the earlier-filed applications, embodiments of the helmet also include stand-alone versions that communicate directly with an emergency communication system, including but not limited to that described in U.S. patent application Ser. No. 14/227,493, and U.S. patent application Ser. No. 14/227,499 without the use of the described belt or the elements thereof.

FIG. 1 is an example of an emergency alert system that may include a helmet of various embodiments disclosed herein. As will be understood of one of skill in the art, the embodiments disclosed can also be configured to work with additional existing emergency alert systems. Thus, FIG. 1 is offered as an example of a system that can be used with embodiments of the present invention.

In FIG. 1, the system 100 for use with embodiments of the present invention includes a sensory unit (SU) 110, which includes a location device 120, including but not limited to a GPS and/or an accelerometer. Adapted for communicating with a microprocessor 115 integrated into the SU 110, are some additional external communication devices, which include an embodiment of the present invention, a helmet 143, that includes one or more sensors integrated into the helmet 143, and one or more sensors integrated into the proprietary Karachute™ 142. The Karachute™ is described in more detail in the aforementioned U.S. patent application Ser. No. 14/227,493, and U.S. patent application Ser. No. 14/227,499. As will be discussed in detail later, the microprocessor 115 in the SU 110 can obtain alerts and/or information from any sensor, including one or more sensors in the helmet 143, through known wireless and/or wired communication protocols. Upon obtaining an alert and/or information that program code executed by the microprocessor 115 determines is problematic, the microprocessor 115, by executing program code, will communicate with a transponder 117, which will communicate with a communication node 140, such as an antenna, a personal computing device, an Internet of Things device, a personal fitness tracker, and a cellular phone. The node 140 routes this communication over a network 145 to at least one terminal 150 accessible by an emergency responder.

Embodiments of the present invention may concurrently communicate this information, and identification information from the SU 110, to a cloud-based system 155 that will supplement the identification information and/or the geographic information utilizing information stored in one or more cloud-based memory resources 160. The supplemental information is routed, by program code executed by one or more processors 165 in the cloud-based system 155, to the at least one terminal 150 accessible to the emergency responder. In some embodiments of the present invention, the node 140 will route the information from the SU 110 to the terminal 150 and the cloud-based system 155 concurrently, while in some embodiments, the information may go to the terminal 150, then to the cloud-based system 155, where it is supplemented, and then back to the terminal 150. In some embodiments, the information from the SU 110, including the location and identification information, may be routed by the node 140, first, to the cloud-based system 155, where it is supplemented, and then, to the terminal 150.

The location of the SU 110 may vary in accordance with the embodiment of the present invention. As explained earlier, the elements of the SU 110 may be integrated into the helmet 143, in addition to being part of an external system with which the helmet 143 may communicate.

The microprocessor 115 in the SU 110 is configured to obtain information and alerts from sensors that are both internal and external to the SU 110, the external sensors include those in the helmet 143, via a receiver 116 and communicate this information via a transponder (or transmitter) 117, to a node 140.

Figure 2:
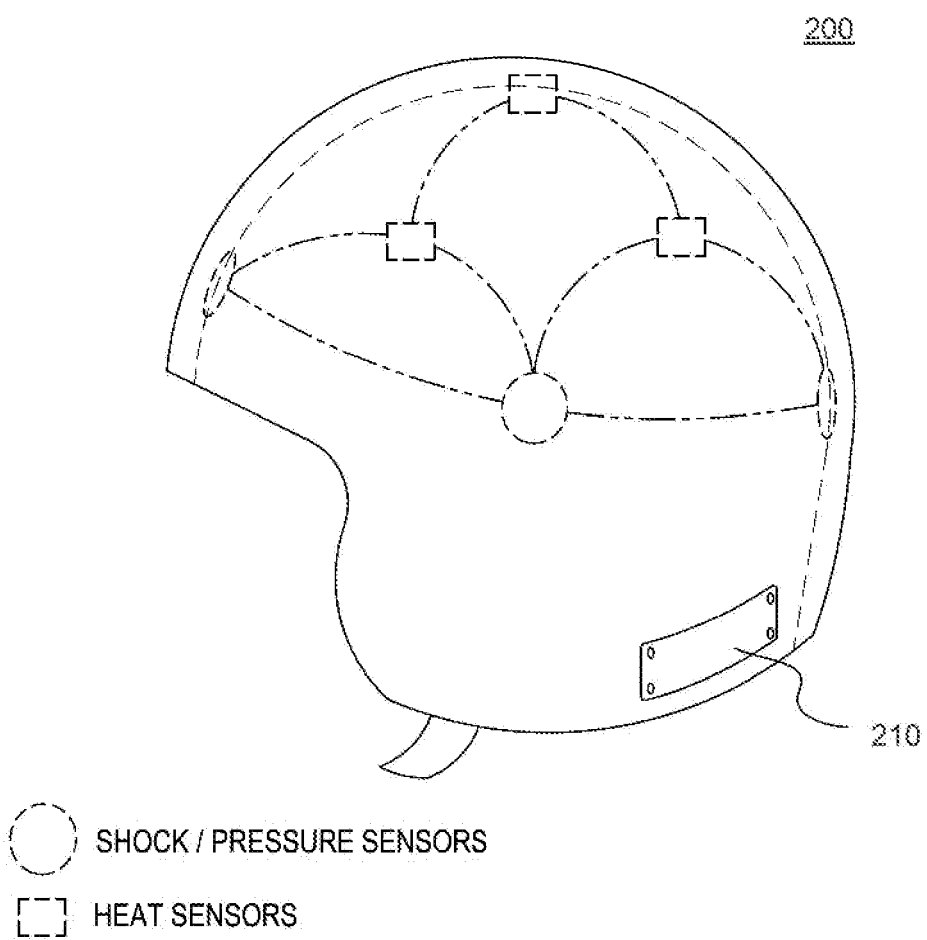
FIG. 2 depicts aspects of an example of an embodiment of the present invention.

Per the discussion accompanying FIG. 1, the SU 110 can receive signals from sensors and triggers external to the SU 110, including but not limited to, a helmet 143, and a Karachute™ 142. FIG. 2 is an embodiment of the helmet 143 for communication with the SU 110, and, ultimately, additional elements of an emergency response system. In an embodiment of the present invention where the SU 110 is integrated into the helmet 143, the SU 110 can receive communications from sensory elements within the helmet 143.

As seen in FIG. 2, an embodiment of a helmet 200, such as the helmet 143 described in FIG. 1, can be used with an emergency alert system and includes both heat sensors and shock sensors. Referring to FIG. 2, the configuration of these sensors is meant as an example as depending upon the activity that the wearer of the helmet 200 is engaged in, different sensor configurations as well as in different helmet shapes can be advantageous. For example, embodiments of the helmet adapted for skiing may vary from those adapted for riding a snowmobile, motorcycle, and/or bicycle.

In an embodiment of the present invention, the heat sensors receive a given threshold of heat in order for the helmet to be active. The heat threshold prevents the microcontroller in the SU 210, and/or any other system element receiving information regarding shocks experienced by sensors in the helmet 200, from receiving alerts from the helmet 200 when the helmet 200 is not in use, i.e., being worn. The shock sensors can be either passive sensors or active sensors, or a combination of both. When a shock threshold is met, the program code executed by a processor in the microcontroller (also referred to as a microprocessor throughout) in the SU 210, described in FIG. 1, will receive this information from the sensors in the helmet 200. The microcontroller receives this information in embodiments of the present invention via a receiver in the SU 210. Upon receipt of a notification from one or more sensors, the microcontroller will obtain location information from the location device, and/or identification information from the memory resource, and communicate via a transponder with an external node, as described earlier. In an embodiment of the present invention, the program code executed by the microcontroller in the SU 210 obtains information from the sensors in the helmet via a transceiver (not pictured) in the helmet. Although not pictured in helmet 200, embodiments of the helmet may also include an integrated power source, including but not limited to, a rechargeable battery.

In a further embodiment of the present invention, which will be discussed in greater detail later, the helmet 200 contains electronic components situated in the SU 210 and/or coupled to the SU 210, also described in FIG. 1 and denoted in that figure as SU 110. In embodiments with this configuration, the components within the helmet 200 communicate alerts to an emergency alert system without utilizing an external SU (i.e., belt), or any other communications relay that is exterior to the helmet 200.

Figure 3:
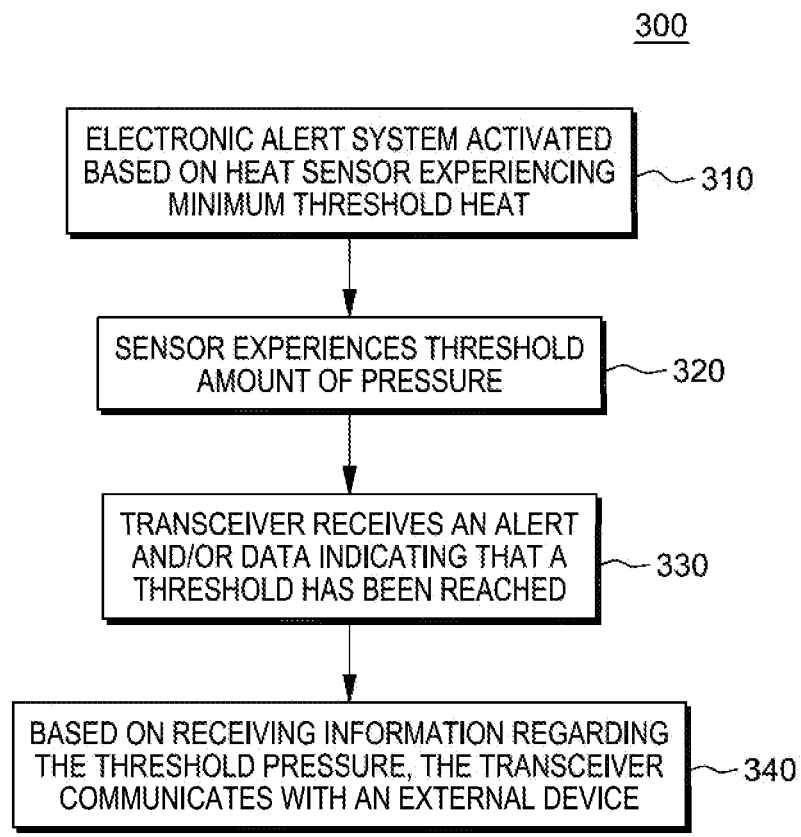
FIG. 3 is a workflow that integrates one or more aspects of embodiments of the present invention.

FIG. 3 is a workflow 300 of a system utilizing aspects of an embodiment of the present invention. An embodiment of the present invention, the electronic alert system within the helmet is activated when at least one embedded heat sensor senses a minimum threshold temperature 310. The source of the heat is the user's head, so the at least one sensor is sensing a temperature relative to the head of an individual wearing an embodiment of the present invention. The temperature sensor(s) is positioned to sense the temperature relative to the user's head to prevent false positives related to the alert system.

At least one shock sensor in the helmet experiences a threshold amount of pressure 320. When triggered by experiencing the threshold amount of pressure, a transceiver in the helmet receives an alert and/or data indicating that a threshold has been reached, from the one or more sensors 330. Based on receiving information regarding the threshold pressure, the transceiver communicates with an external device, including but not limited to a microcontroller in an SU 340. In a further embodiment of the present invention, the transceiver in the helmet may communicate with a communication node of a communications network, the node being coupled to a network connection and accessible via at least one terminal that can be utilized by an emergency responder.

Figure 4:
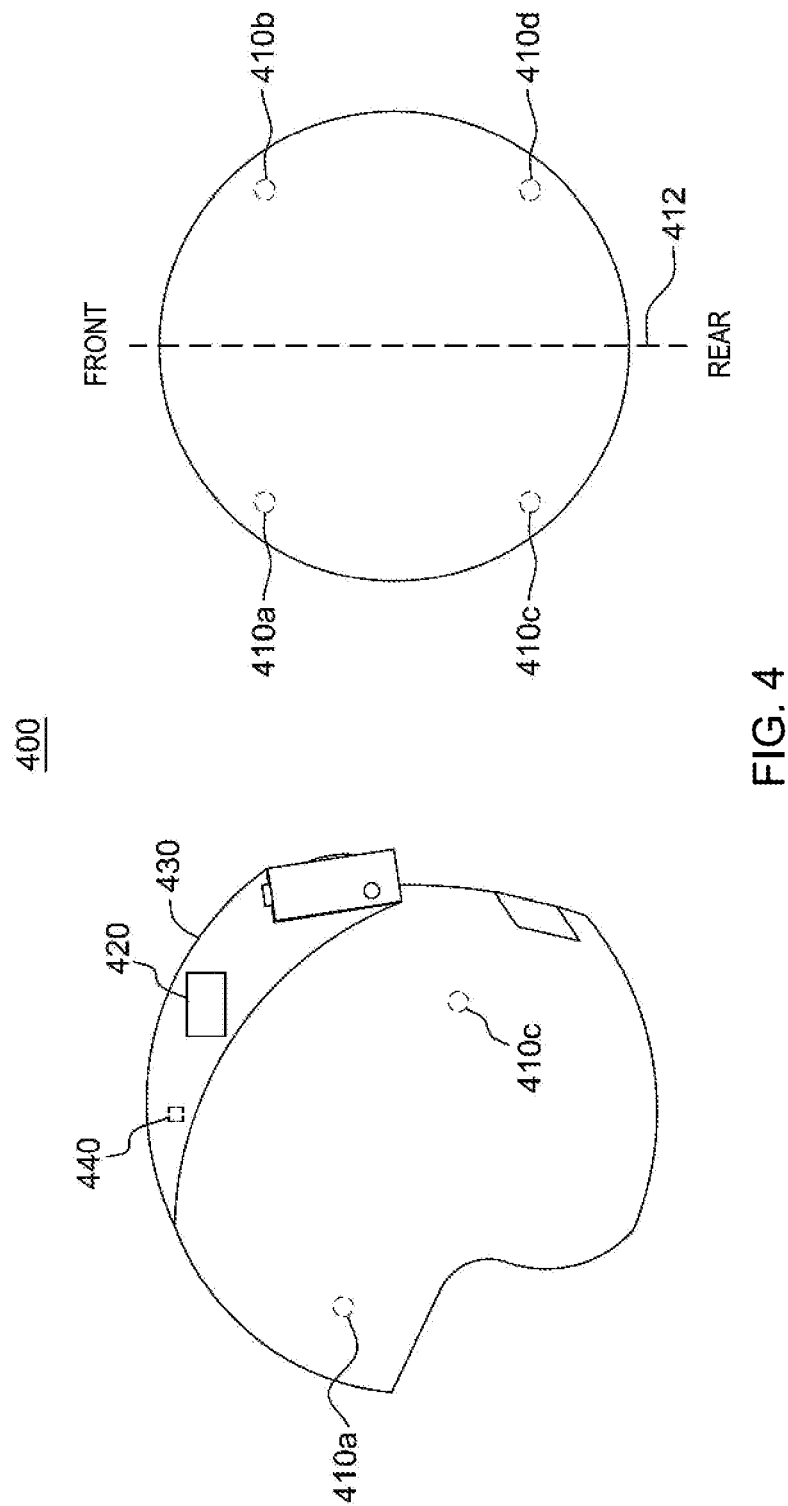
FIG. 4 depicts aspects of an example of an embodiment of the present invention.

FIG. 4 is an embodiment of a helmet 400 wherein four shock sensors 410a-410d are positioned in various regions of the helmet 400 in order to experience impacts when the helmet is subjected to externally-generated pressures from different directions, including but not limited to a sudden external pressure. If any one of the sensors reaches a pre-determined threshold, the transceiver 420 will receive data regarding the impact and convey this data to an emergency response system, including but not limited to a system including the aforementioned SU.

As seen in FIG. 4, shock sensors 410a-410d are positioned on the helmet so that they are adjacent to different areas of the wearer's head. A first sensor 410a is adjacent the left frontal and temporal areas. A second sensor 410b is adjacent the right frontal and temporal areas. A third sensor 410c is positioned relative to the left side of the user's head, like the first sensor, but in an area that is adjacent to the occipital and parietal areas. A fourth sensor 410d is positioned similarly to the third sensor 410c, but on the right side. When the helmet 400 receives an impact from an external event and/or experiences a certain external condition, the head of the wearer of the helmet 400 acts as a back stop, allowing the sensors 410a-410d to experience the pressure of the impact.

As aforementioned, the present invention includes at least one heat sensor. Unless the heat sensor senses a temperature of a given threshold, aspects of the electronic alert system within helmet that trigger an alert, are not operational. For example, in an embodiment of the present invention, the heat sensor, upon reaching a given threshold temperature, activates the shock sensors. In another embodiment of the present invention, the heat sensor, upon reaching a given threshold temperature, activates the transceiver.

Returning to FIG. 4, communications from the shock sensors to any external system, including but not limited to the SU, are not active unless the heat sensor 440 has activated the electronic alert system within the helmet 400. In the embodiment of FIG. 4, the helmet 400 includes a dome 430 area that includes the at least one heat sensor 440. The heat sensor 440 is located in the dome 430 of the helmet 400 so that it cannot be affected by temperatures external to the helmet, which could obscure the reading of the internal helmet temperature. Longitudinal axis 412 indicates the relative position of the shock sensors 410a-410d on the helmet 400.

The positioning of the shock sensors can vary in accordance with the present invention and different configurations may be more suitable to protect the user during different types of activity. The number and the positioning of the sensors can be customized in accordance with the intended use of the helmet and the type of impacts a user may experience and when/if alerts should be triggered based on those impacts.

Figure 5:
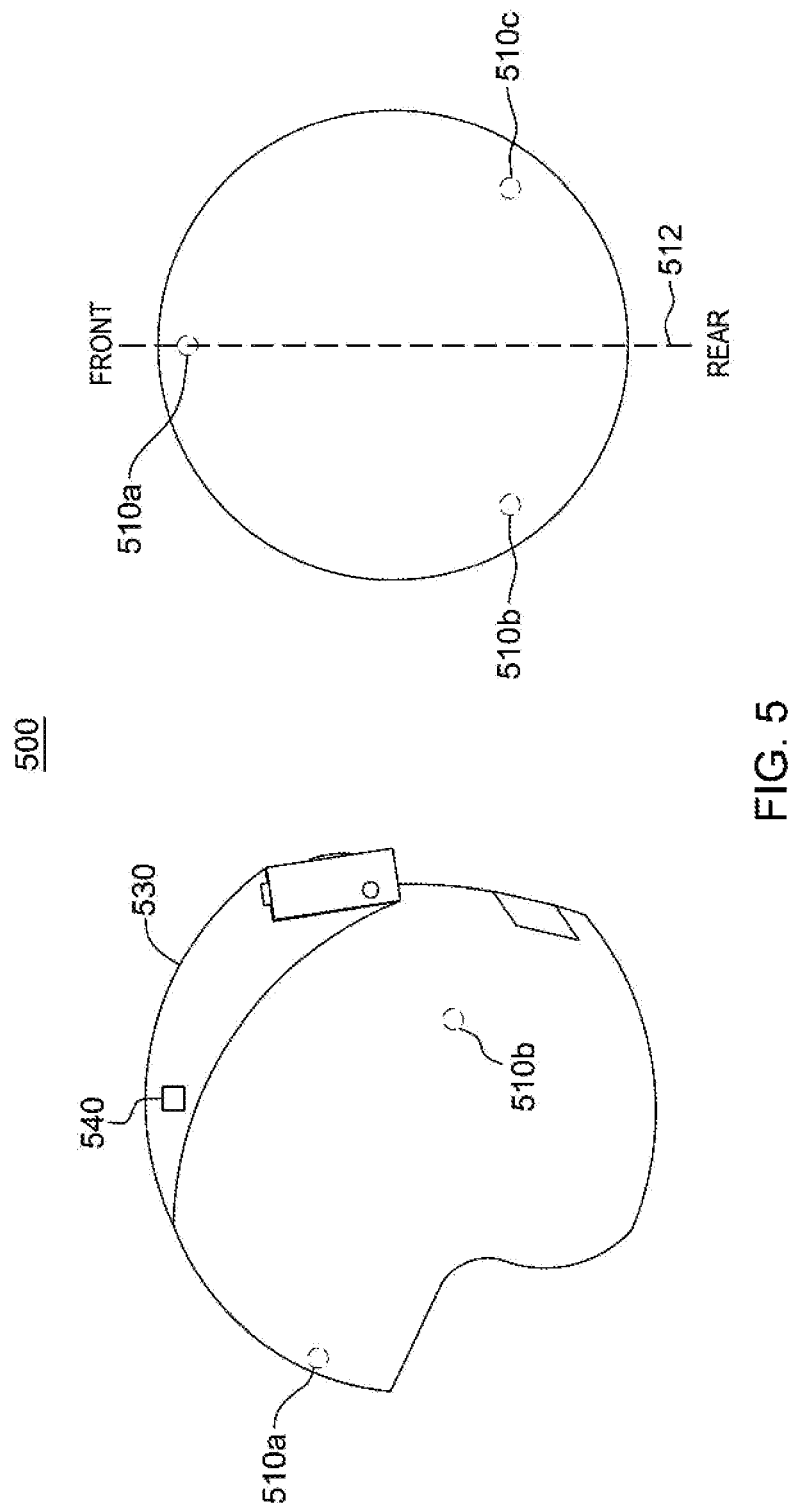
FIG. 5 depicts aspects of an example of an embodiment of the present invention.

FIG. 5 is another embodiment of the present invention. In this embodiment of a helmet 500, the helmet 500 includes three shock sensors 510a-510c. In this embodiment, a first sensor 510a is positioned adjacent to the frontal area of the head of a user. A second sensor 510b is positioned adjacent to the occipital and/or parietal areas of the user's head, on the left side, and the position of the third sensor 510c mirrors the second sensor 510b across a central longitudinal axis 512 of the helmet and is therefore located on the right. Like the embodiment of FIG. 5, this embodiment also includes a heat sensor 540 positioned in a dome area 530 of the helmet. The shock sensors in the present embodiment are positioned adjacent to occipital area and the parietal areas of the wearer.

Figure 10:
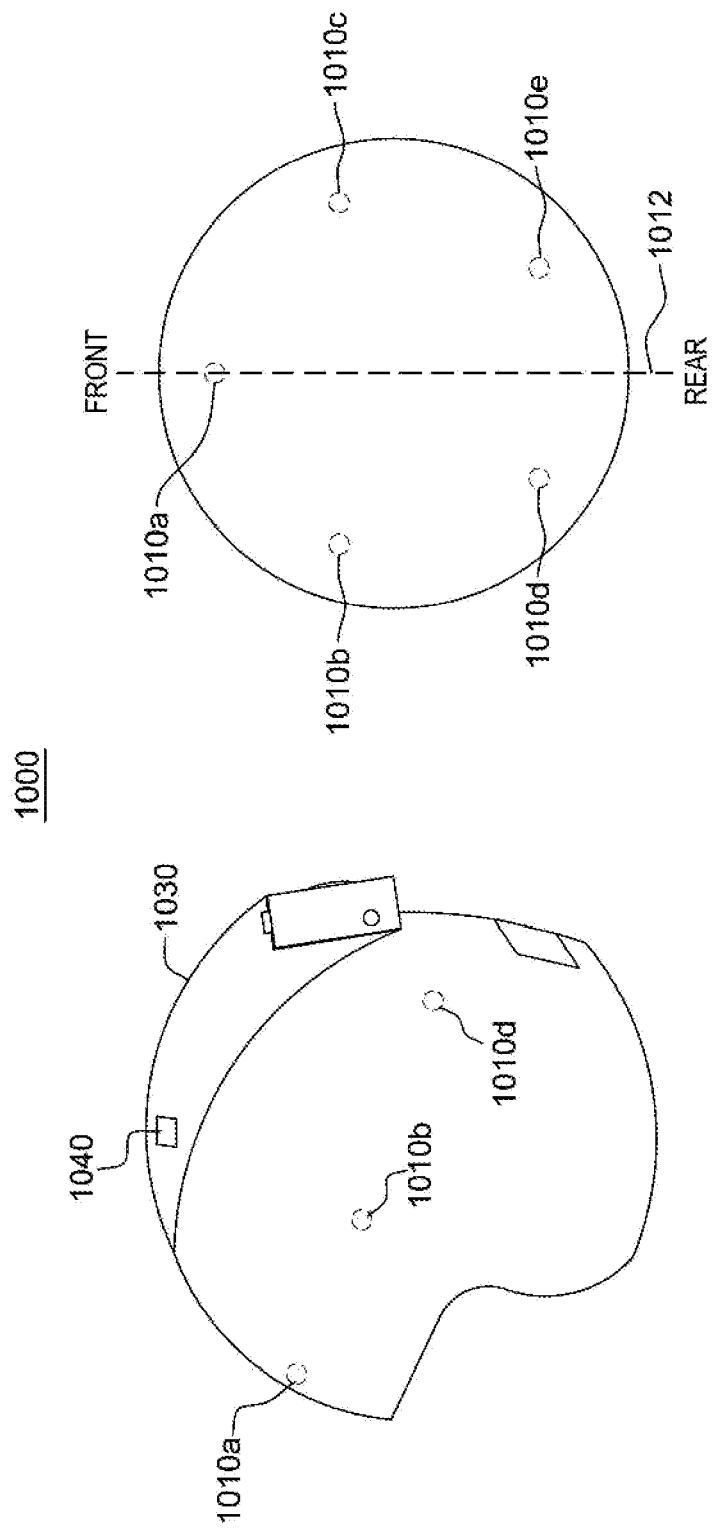
FIG. 10 aspects of an example of an embodiment of the present invention.

FIG. 10 is an example of a further configuration of the helmet 1000 which includes five shock sensors 1010a-1010e. In this embodiment, a first sensor 1010a is positioned adjacent to the frontal area of the user. A second sensor 1010b is positioned adjacent to the left frontal and temporal areas of a user's head when wearing the helmet. A third sensor 1010c is positioned adjacent to the right front and temporal areas. A fourth sensor 1010d is positioned adjacent to temporal and occipital areas of the user, on the left side, and a fifth sensor 1010e is positioned adjacent to temporal and occipital areas of the user, on the right side. Like the embodiment of FIG. 5, this embodiment also includes a heat sensor 1040 positioned in a dome area 1030 of the helmet. A longitudinal axis 1012 is displayed in FIG. 10 in order to provide a visual regarding the relative position of the sensors 1010a-1010e.

Figure 6:
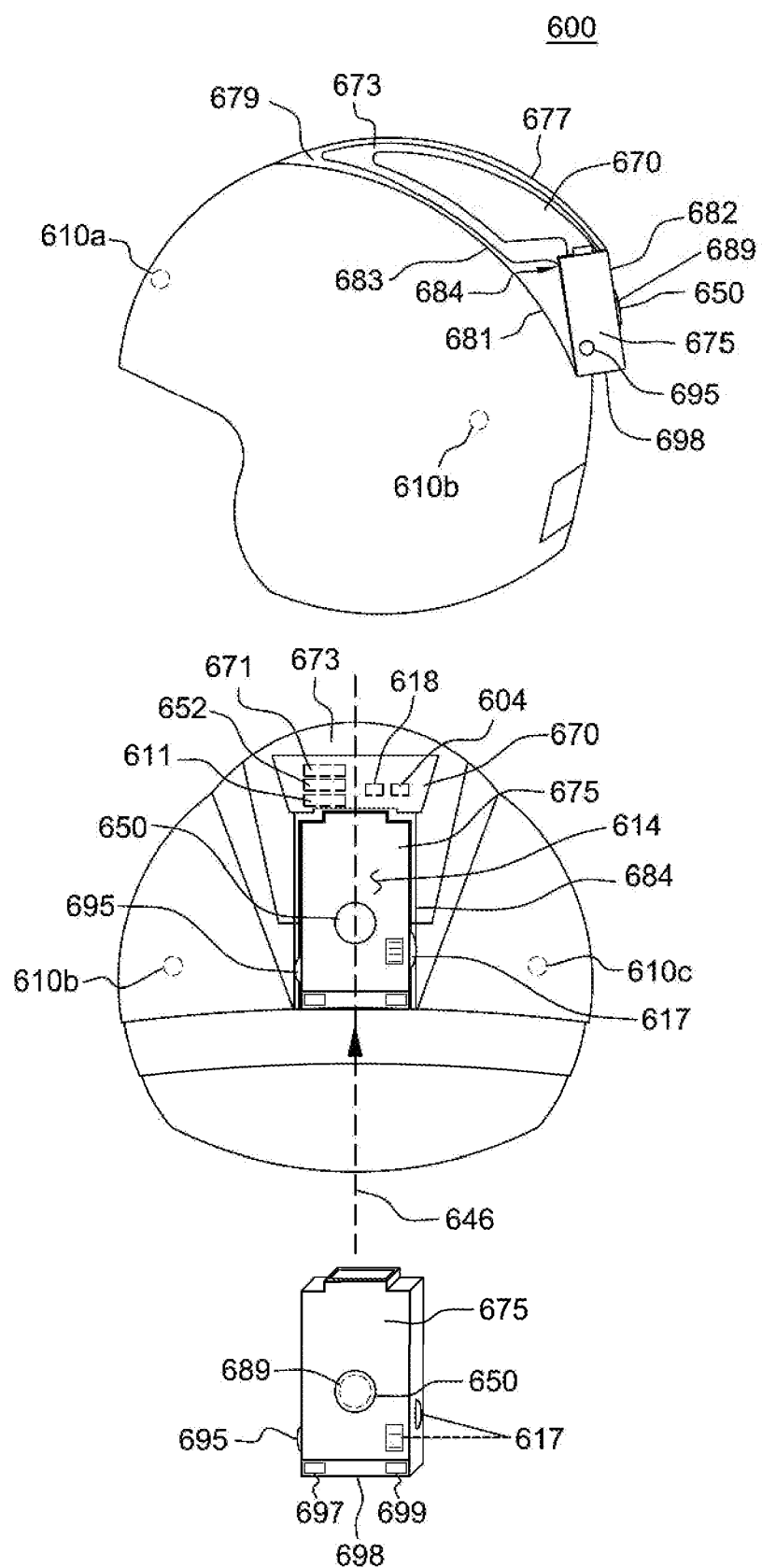
FIG. 6 depicts aspects of an example of an embodiment of the present invention.

As discussed in reference to the preceding figures, shock sensors of the helmets are communicatively coupled to a transceiver, which alerts external devices, such as an SU when an impact is suffered by the helmet, provided that the heat sensor measures the predetermined threshold to enable the alerts on impact. However, further embodiments of the present invention integrate additional elements into the helmet, so that the helmet can communicate more useful data to an emergency responder without the assistance of an external component, such as the earlier described SU. FIG. 6 is an example of one such embodiment with this enhanced capability.

In addition to being triggered by external events and conditions, the embodiment of FIG. 6 can also be manually triggered through a manual control 689. This helmet 600 features all the items in the SU and location device described in U.S. patent application Ser. No. 14/227,493, and U.S. patent application Ser. No. 14/227,499. Thus, helmet 600 can communicate with the emergency response system, including the cloud-based resources described in these applications, in the same manner as the SU that is integrated into a belt in these applications. The helmet 600 may also be configured to communicate with existing emergency response systems and communications networks.

The helmet 600 includes two sets of electrical and processing components that enable the helmet 600 to communicate with an emergency response system, such as that described in the aforementioned applications. The electronics that enable communication and other functionality in the helmet 600 comprise a female receptacle 670 and a male cartridge 675. Although the male cartridge is removable, when the helmet is operational 600, both the female receptacle 670 and the male cartridge 675 are positioned in a compartment 673 situated in reverse teardrop portion 677 of the helmet 600. This shape is offered as an example of a possible shape and was chosen because it enables the helmet 600 to conform to current safety requirements for helmets used for skiing and snowboarding. However, as the uses of the helmets change, so may the requirements, and so may the shapes of the portion(s) of the helmets into which the electrical components may be integrated. As understood by one of skill in the art, requirements for helmets referenced in this application are not dictated by the present invention but instead refer to safety requirements established by safety and governance bodies in order to protect the welfare of individuals involved in various activities for which helmets are utilized.

The compartment 673 in the reverse teardrop portion 677 comprises a slot 684 dimensioned to accommodate the male cartridge 675. The slot 684, which is positioned on a central longitudinal axis 646 of the helmet in a position that is adjacent to the parietal area of a wearer's head, is accessible from the outside of the helmet, is outwardly accessible in that a user can connect the male cartridge 675 to the female receptacle 670 and the male cartridge 675 then fills the slot 684. When the male cartridge 675 is inserted, and is connected to the female receptacle 670, an outward-facing surface 682 of the male cartridge 675 is flush to an outer surface 683 of the helmet 600.

In an embodiment of the present invention, this outward-facing surface 682, of the male cartridge 675, includes and ON/OFF switch 695, or other manual power control, that can therefore be accessed by a user. In an embodiment of the present invention, the outward-facing surface 682 of the male cartridge 675 also includes a manual control 689, such as a manual alert button, that the wearer can access in order to manually trigger the alert system of the helmet 600. Embodiments of the present invention also included in the male cartridge 675, a visual indicator 697, such as LED lights that indicate power source availability (e.g., remaining battery life) and/or the working integrity of the electronic components, and a port 698, such as a USB port, for charging the power source 699, and/or a power source 699, including but not limited to one or more batteries and/or solar cells.

In an embodiment of the present invention, when the wearer of the helmet 600 activates the manual control 689, for example, by depressing/engaging a manual alert button, the portions of the embodiment that communicate an emergency alert, including but not limited to, a location device 618, a microcontroller 611 and a communication device 604, will not communicate the alert to an external emergency response system unless the manual control 689 has been activated, i.e., depressed, for a predetermined interval. In an embodiment of the present invention, the microcontroller 611 will not obtain an alert from the manual control 689, until the manual control 689 has been depressed/engaged and the predetermined interval has elapsed. For example, if the predetermined interval is five seconds, the microcontroller 611 may receive an alert from the manual control 689 only after the manual control 689 has been engaged by the user of the helmet 600 for at least five seconds. In an embodiment of the present invention, the length of the interval is determined by program code on a memory device accessible to the microcontroller 611 and executable by the microcontroller 611. In a further embodiment of the present invention, the length of the interval is a configurable setting that is saved on a memory device accessible to the microcontroller 611. Program code executed by the microcontroller 611 accesses this memory to determine the length of the interval before sending an alert.

In an embodiment of the present invention, apart from the male cartridge 675, once joined with the female receptacle 670, cannot be removed from the helmet 600 without the use of a specialized tool or release key (not pictured). A release 617, when engaged with a key (not pictured) will release the male cartridge 675 and also, enable an individual to access the area toward the back of the helmet 681 in the compartment in the reverse teardrop portion 677. It is contemplated that for purposes of safety, the release key will only be available to individuals who supply and/or maintain the helmet 600, rather than customers who purchase the helmet 600.

In the area closest to the front of the helmet 679 in the compartment in the reverse teardrop portion 677 is the female receptacle 670. The female receptacle 670 is not accessible from the exterior of the helmet 600, but only accessible from the inside by authorized individuals maintaining the helmet. The male cartridge 675, which is removable, is connected to the female receptacle 670 and placed in the aforementioned dimensioned slot 684 area toward the back of the helmet 681. In this embodiment, the male cartridge 675 can be swapped in and out of the helmet 600 by individuals maintaining the helmet 600 using the specialized tool or release key.

The female receptacle 670 is comprised of an SU 671 and a location device 618, a microcontroller 611 and a communication device 604, for example, a transmitter, transponder, and/or the transceiver (not pictured) in SU 210 of FIG. 2.

The location device 618 is a device capable of obtaining the location of an individual and representing it in a manner that can be communicated to emergency responders. Embodiments of the present invention utilize a variety of location devices, including but not limited to one or more of a GPS transponder, an accelerometer, and/or a personal navigation system, to provide an alert to emergency personnel and to communicate information to the emergency personnel that the personnel can utilize in locating and rescuing an individual. As explained earlier, the SU includes components that communicate with shock sensors 610a-610c, in this case, the shock sensors in the helmet 600 and utilizes a microprocessor to execute software that ultimately alerts emergency responders to the need for assistance. The full functionality of this element is explained in the applications incorporated by reference.

In an embodiment of the present invention, a wearer of the helmet can operate the on/off switch 695 and the manual control 689, such as a manual alert button, by depressing it through a malleable membrane 650 because in an embodiment of the present invention, the outward-facing surface 682 of the male cartridge is flush to an outer surface 683 of the helmet 600. In an embodiment of the present invention, the manual alert button, which is the manual control 689, is covered by the malleable material 650 in the outer helmet covering the outer housing 614, that enables the switch and button to be depressed by applying pressure to the outward-facing surface 682 of the male cartridge 675. In an embodiment of the present invention, the manual control 689 may be comprised of the outward-facing surface 682 that may be comprised of silicone and/or other comparable materials.

In an embodiment of the present invention, the portion of the helmet that is positioned on the outer surface of the inserted male cartridge 675 includes a window covered with malleable material 650. When the male cartridge 675 is connected to the female receptacle 670, the window comprised of a malleable material is positioned over the button, forming a concave depression over the manual alert button, which is the manual control 689 in this embodiment of the present invention.

Returning to FIG. 6, the communications port 698 can be utilized to upload new program code into the microcontroller 611, to recharge the power source 699, diagnose issues with the microcontroller 611, and collect data, by interacting with the microcontroller. Standard communication ports such as USB ports and mini-USB ports, or comparable structures known to one of skill in the art, can be utilized in various embodiments of the present invention.

In the embodiment of FIG. 6, the visual indicator 697, which is observable from the outer surface of the helmet 600, indicates the power remaining in the power source 699. The power source 699 powers the elements in the female receptacle, including the location device 618. A microcontroller 611 in the female receptacle includes a memory resource 652, including but not limited to internal memory and/or a flash drive.

The memory resource 652 contains a unique identifier, which works in conjunction with the alert system described in U.S. patent application Ser. No. 14/227,493, and U.S. patent application Ser. No. 14/227,499. In an embodiment of the present invention, when the program code executed by a processor in the microcontroller 611 obtains a notification indicating either that the threshold has been met on the pre-defined number of sensors (not pictured), and/or a manual control 689 has been depressed by the user, program code executed by a processing resource in the microcontroller 611 obtains location information from location device 618, pulls the identifier from the memory resource 652 and sends this information to the communication device 604, for transmission to a node of a communications network.

Regarding the power source 699, depending upon the activities during which the helmet 600 is worn, certain batteries may provide important advantages. For example, when the helmet 600 is utilized by a user engaged in a physical activity that is scheduled for a long-time interval, including but not limited to a long-range bicycle trip, a multi-day ski trip, etc., rechargeable lithium ion batteries are useful because these batteries last about 5 12-hour days on a single charge, can withstand cold temperatures and moisture, and come in compact sizes that are easily integrated into a helmet (e.g., 1"×2" sizes).

Figure 7:
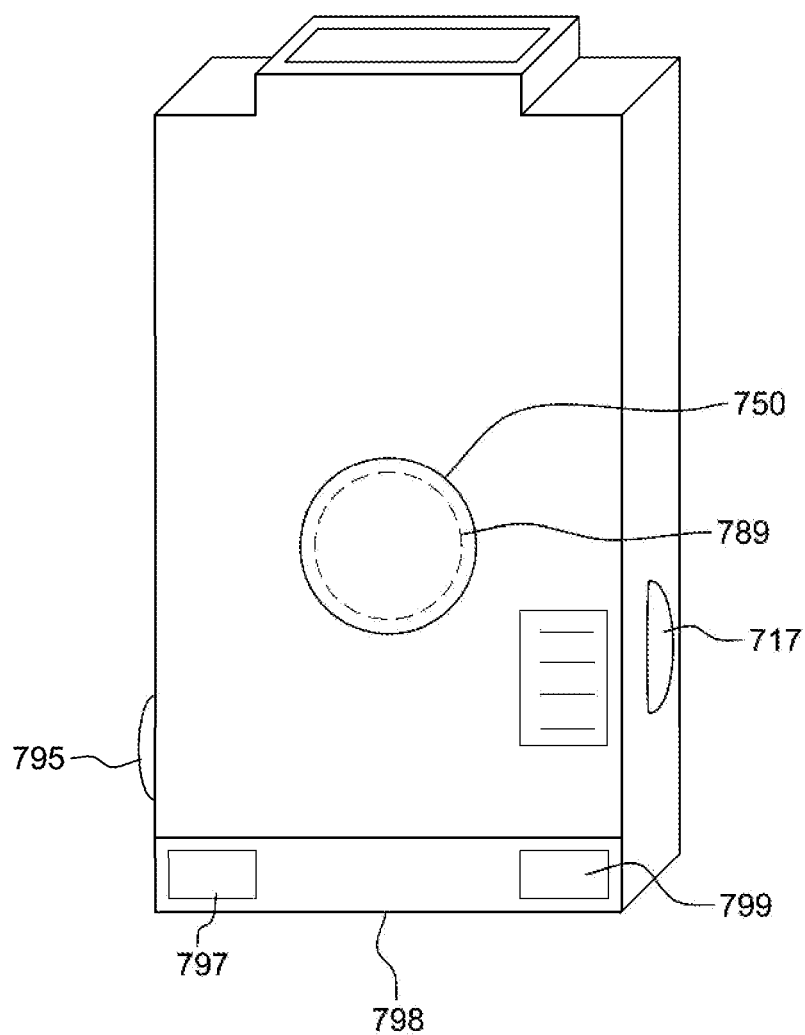
FIG. 7 depicts aspects of an example of an embodiment of the present invention.
Figure 7:
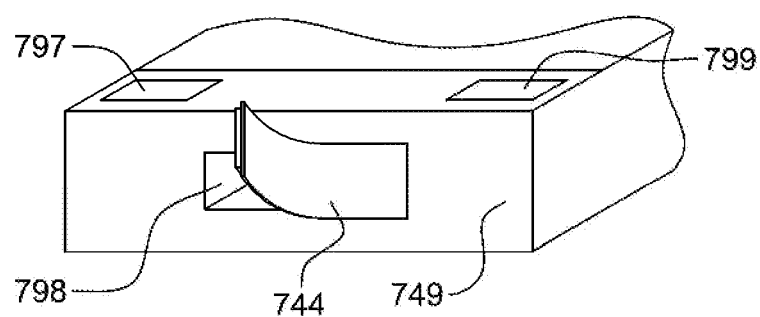

FIG. 7 is an embodiment of the male cartridge 775 for insertion into the aforementioned compartment in the helmet 600. As seen in FIG. 7, the manual control 789, which in this example is a button on an outside surface of the male cartridge 775 is covered by a malleable covering 750. This orientation enables a wearer to depress the manual control 789 by touching the malleable portion of the outside surface of the helmet that covers this manual control 789 when the male cartridge is inside the compartment in the helmet 600. FIG. 7 depicts a view from the bottom of the male cartridge 775, to show a port 798 on the bottom surface. As explained earlier, in embodiments of the present invention, this port may be utilized to charge a power source within an embodiment of the helmet and/or as a communication port to communicate with and configure a microcontroller and/or microprocessor in the helmet.

In an embodiment of the present invention, when the port 798 is not being used to transfer data and/or charge a power source, it can be sealed with a malleable cover 744 that is attached on at least one side to a bottom surface 749 of the male cartridge 775. In an embodiment of the present invention, the cover 744 is comprised of a water resistant material, and when secured over the port 798, it protects the port 798 and other internal components from external moisture. The cover 744 may include some perforations in the malleable material to enable a user to manipulate the cover 744, for example, by gripping the cover 744 to expose the port 798 for charging, more easily. When closed over the port 798, the cover 744 may be flush with the bottom surface of the male cartridge 775.

An embodiment of the present invention can be utilized in conjunction with an existing helmet. This embodiment will enable helmet manufacturers to integrate the safety features offered by the present invention into their existing product lines, which have already passed industry safety standards and are approved for sale. This "add-on" version of the present invention would offer helmet wearers a broader selection of helmets and, in fact, a user may be able to utilize a favorite helmet design with this "add-on." FIG. 11 is an embodiment of the present invention where the described "add-on" provides the safety features of the present invention to an existing helmet body 1119, forming another embodiment of the helmet 1100 of the present invention.

Figure 11:
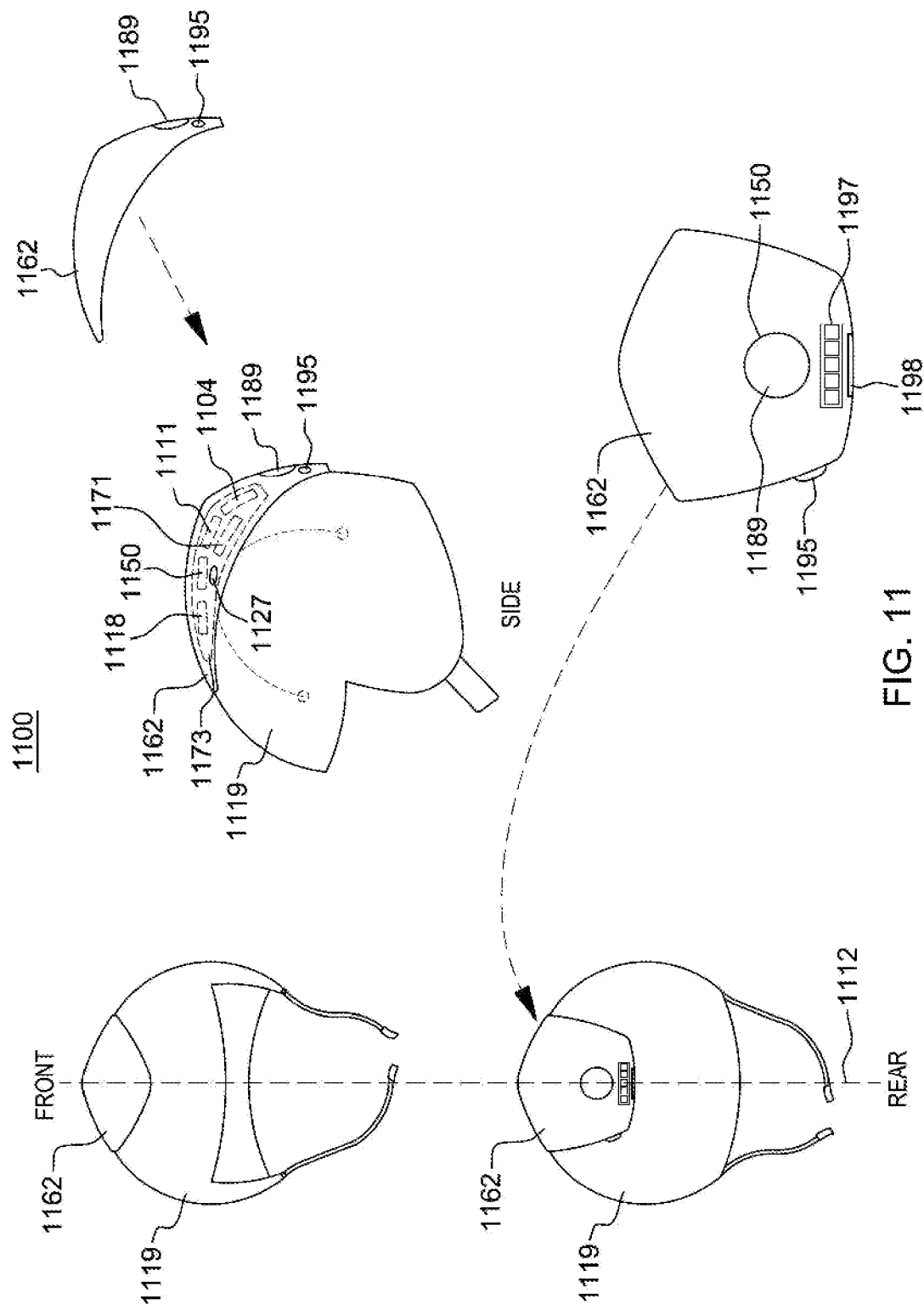
FIG. 11 depicts aspects of an example of an embodiment of the present invention.

Referring to FIG. 11, a component 1162, can be affixed to a helmet body 1119. This component 1162 includes at least some of the features integrated into the male cartridge 675 in the embodiment of the helmet 600 in FIG. 6. Returning to FIG. 11, the component 1162, includes a manual control 1189, for example, a manual alert button, covered with a malleable covering 1150. The component 1162 also comprises an ON/OFF mechanism, such as a power switch 1195 that can be manually activated by a wearer. A port 1198 may also be included in an embodiment of the component 1162, and may be used to charge a power source (not pictured) in the component 1162. The level of charge of the power source can be monitored from the outside of the helmet 1100 because the component 1162 includes a visual indicator 1197, which may include at least one light-emitting diode (LED).

In an embodiment of the present invention, the helmet, such as those in the accompanying figures, may produce feedback to alert the wearer that components of the helmet have sent an alert to an external network, including but not limited to, an emergency response system. In an embodiment of the present invention, the feedback provided to the user to indicate that the wearable system has communicated with an emergency response system may be haptic, visual, and/or auditory. In an embodiment of the present invention, visual feedback may be provided and may be viewable from the exterior of the helmet, including but not limited to illuminating an LED. In a further embodiment of the present invention, feedback may be auditory and program code executed by the microcontroller in the helmet may produce a sound. In an embodiment of the present invention, the program code may produce haptic feedback, for example, by agitating a portion of the helmet, for example, the manual control. In an embodiment of the present invention, after the wearer engages the manual control for the aforementioned predetermined interval (to initiate an alert), in response, program code executed by a microcontroller may send auditory, visual, and/or haptic feedback to the user.

In an embodiment of the present invention the component 1162 may include a compartment 1173 that includes various components of the present system, including, but not limited to, a location device 1118, an SU 1171, a microcontroller 1111, and a communication device 1104.

The component 1162 connects to the outer dome of an off-the-shelf helmet body 1119 along a longitudinal axis 1112, as seen in FIG. 11. In order to receive information from a heat sensor 1150, in the manner described earlier (to avoid false positives), an aperture 1127 may be formed in the helmet body 1119, so that a heat sensor 1150 can be placed proximate to the head of the wearer on the inside of the helmet 1100. Wiring or other communication relays may be utilized to connect the heat sensor 1150 to the microcontroller 1111, and/or other components in the component 1162 affixed to the helmet body 1119.

Figure 8:
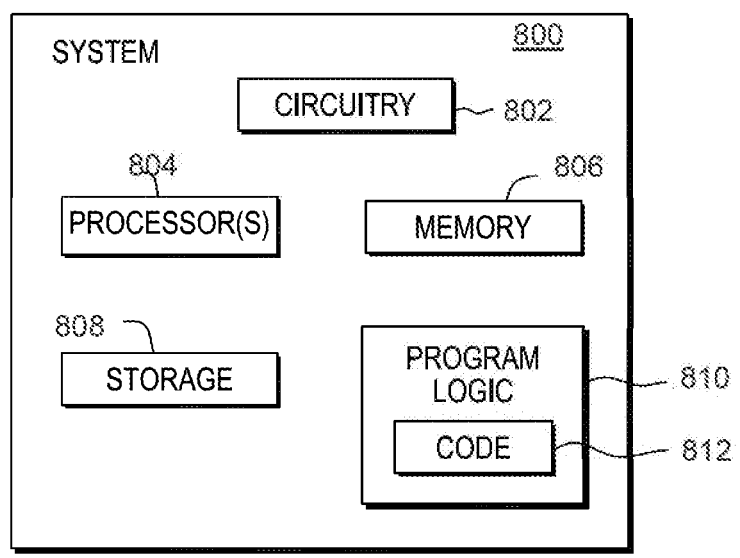
FIG. 8 depicts one embodiment of a single processor computing environment to incorporate and use one or more aspects of the present invention.

FIG. 8 illustrates a block diagram of a computer resource 800, like microcontroller 611, which is part of the technical architecture of certain embodiments of the invention. The resource 800 may include a circuitry 802 that may in certain embodiments include a microprocessor 804. The computer system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the microprocessor 804 or circuitry 802.

In certain embodiments, the program logic 810 including code 812 may be stored in the storage 808, or memory 806. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Using the processing resources of a resource 800 to execute software, computer-readable code or instructions, does not limit where this code can be stored. The terms program logic, code, and software are used interchangeably throughout this application.

Figure 9:
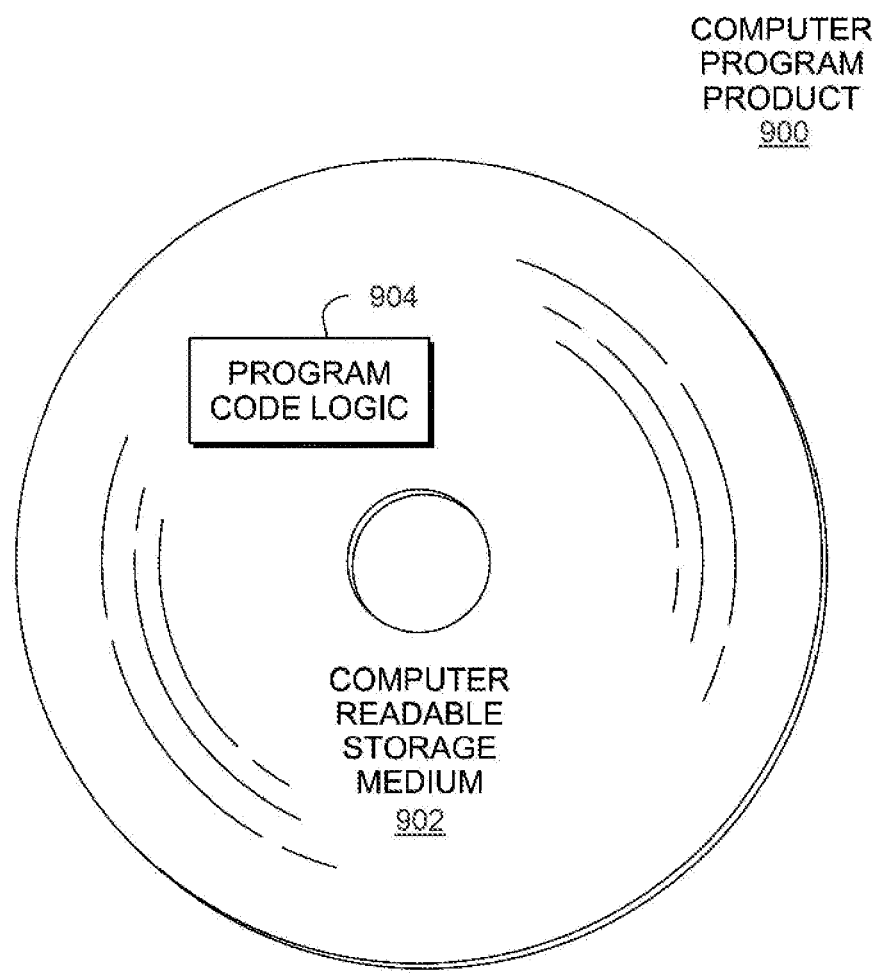
FIG. 9 depicts one embodiment of a computer program product incorporating one or more aspects of the present invention.

Referring to FIG. 9, in one example, a computer program product 900 includes, for instance, one or more non-transitory computer readable storage media 902 to store computer readable program code means or logic 904 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, assembler or similar programming languages. The program code may execute entirely on one computer resource in the system, partly on this one computer resource, as a stand-alone software package, partly on the computer resource and partly on a remote computer or entirely on the remote computer or server. In the latter scenario, the remote computer may be connected to the noted computer resource through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions, also referred to as computer program code, may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method comprising:
  establishing, by one or more processors of a computing node, a communication connection between an activated wearable emergency alert apparatus of a user and the computing node, wherein the activated wearable emergency alert apparatus was automatically activated by a microcontroller of the wearable emergency alert apparatus based on the microcontroller obtaining an alert from a heat sensor of the wearable emergency alert apparatus, based on the heat sensor sensing heat at a pre-determined threshold, wherein based on being activated, the wearable emergency alert apparatus transmits notifications to the computing node via the communication connection, and wherein the communication connection is terminated based on the wearable emergency alert apparatus being de-activated;
  obtaining, by the one or more processors, via the communication connection, a notification from the wearable emergency alert apparatus of the user, wherein the wearable emergency alert apparatus transmits the notification to the computing node based on a portion of the wearable emergency alert apparatus experiencing an event;

based on the notification, determining, by the one or more processors, a location of the wearable emergency alert apparatus;

based on obtaining the notification, obtaining, from a memory communicatively coupled to the one or more processors, a unique identifier of the wearable emergency alert apparatus;

querying, by the one or more processors, based on the unique identifier, one or more cloud-based memory resources to identify additional data;

based on the querying, obtaining, by the one or more processors, the additional data from one or more cloud-based memory resources; and transmitting, by the one or more processors, a message comprising the unique identifier, the location, and the additional data, to a predefined destination.

2. The computer-implemented method of claim 1, wherein the event is selected from the group consisting of: the wearable emergency alert apparatus experiencing pressure from a source external to the wearable emergency alert apparatus exceeding a pre-determined threshold and the wearable emergency alert apparatus obtaining an input from the user wearing the wearable emergency alert apparatus.

3. The computer-implemented method of claim 2, wherein the wearable emergency alert apparatus comprises a manual alert button, and wherein the obtaining is via the manual alert button.

4. The computer-implemented method of claim 1, wherein the event comprises the wearable emergency alert apparatus determining that movement of a user wearing the wearable emergency alert apparatus is outside of a predefined range of movement.

5. The computer-implemented method of claim 1, wherein the computing node transmits the message on a communications network external to the wearable emergency alert apparatus.

6. The computer-implemented method of claim 1, wherein the computing node is selected from the group consisting of: an antenna, a personal computing device, an Internet of Things device, a personal fitness tracker, and a cellular phone.

7. The computer-implemented method of claim 1, wherein the predefined destination is selected from the group consisting of: at least one terminal accessible by an emergency responder and a contact stored in the memory.

8. The computer-implemented method of claim 1, wherein the activated wearable emergency alert apparatus is de-activated by the microcontroller based on the heat sensor obtaining a new heat value of less than the given threshold.

9. A computer program product comprising:

a non-transitory computer readable storage medium readable by one or more processors of a computing node and storing instructions for execution by the one or more processors for performing a method comprising:

establishing, by the one or more processors, a communication connection between an activated wearable emergency alert apparatus of a user and the computing node, wherein the activated wearable emergency alert apparatus was automatically activated by a microcontroller of the wearable emergency alert apparatus based on the microcontroller obtaining an alert from a heat sensor of the wearable emergency alert apparatus, based on the heat sensor sensing heat at a pre-determined threshold, wherein based on being activated, the wearable emergency alert apparatus transmits notifications to the computing node via the communication connection, and wherein the communication connection is terminated based on the wearable emergency alert apparatus being de-activated;

obtaining, by the one or more processors, via the communication connection, a notification from the wearable emergency alert apparatus of the user, wherein the wearable emergency alert apparatus transmits the notification to the computing node based on a portion of the wearable emergency alert apparatus experiencing an event;

based on the notification, determining, by the one or more processors, a location of the wearable emergency alert apparatus;

based on obtaining the notification, obtaining, from a memory communicatively coupled to the one or more processors, a unique identifier of the wearable emergency alert apparatus;

querying, by the one or more processors, based on the unique identifier, one or more cloud-based memory resources to identify additional data;

based on the querying, obtaining, by the one or more processors, the additional data from one or more cloud-based memory resources; and transmitting, by the one or more processors, a message comprising the unique identifier, the location, and the additional data, to a predefined destination.

10. The computer program product of claim 9, wherein the event is selected from the group consisting of: the wearable emergency alert apparatus experiencing pressure from a source external to the wearable emergency alert apparatus exceeding a pre-determined threshold, the wearable emergency alert apparatus obtaining an input from the user wearing the wearable emergency alert apparatus, and the wearable emergency alert apparatus determining that movement of the user wearing the wearable emergency alert apparatus is outside of a predefined range of movement.

11. The computer program product of claim 10, wherein the wearable emergency alert apparatus comprises a manual alert button, and wherein the obtaining is via the manual alert button.

12. The computer program product of claim 9, wherein the computing node transmits the message on a communications network external to the wearable emergency alert apparatus.

13. The computer program product of claim 9, wherein the computing node is selected from the group consisting of: an antenna, a personal computing device, an Internet of Things device, a personal fitness tracker, and a cellular phone.

14. The computer program product of claim 9, wherein the activated wearable emergency alert apparatus is de-activated by the microcontroller based on the heat sensor obtaining a new heat value of less than the given threshold.

15. A computing node comprising:

a memory;

one or more processors in communication with the memory;

program instructions executable by the one or more processors via the memory to perform a method, the method comprising:

establishing, by the one or more processors, a communication connection between an activated wearable emergency alert apparatus of a user and the computing node, wherein the activated wearable emergency alert apparatus was automatically activated by a microcontroller of the wearable emergency alert apparatus based on the microcontroller obtaining an alert from a heat sensor of the wearable emergency alert apparatus, based on the heat sensor sensing heat at a pre-determined threshold, wherein based on being activated, the wearable emergency alert apparatus transmits notifications to the computing node via the communication connection, and wherein the communication connection is terminated based on the wearable emergency alert apparatus being de-activated;

obtaining, by the one or more processors, via the communication connection, a notification from the wearable emergency alert apparatus of the user, wherein the wearable emergency alert apparatus transmits the notification to the computing node based on a portion of the wearable emergency alert apparatus experiencing an event;

based on the notification, determining, by the one or more processors, a location of the wearable emergency alert apparatus;

based on obtaining the notification, obtaining, from a memory communicatively coupled to the one or more processors, a unique identifier of the wearable emergency alert apparatus;

querying, by the one or more processors, based on the unique identifier, one or more cloud-based memory resources to identify additional data;

based on the querying, obtaining, by the one or more processors, the additional data from one or more cloud-based memory resources; and transmitting, by the one or more processors, a message comprising the unique identifier, the location, and the additional data, to a predefined destination.

16. The computing node of claim 15, wherein the activated wearable emergency alert apparatus is de-activated by the microcontroller based on the heat sensor obtaining a new heat value of less than the given threshold.

* * * * *